(12) United States Patent
DeCosta

(10) Patent No.: US 7,112,744 B1
(45) Date of Patent: Sep. 26, 2006

(54) SECTIONAL PLATE FOR WALL PORT

(76) Inventor: Tom DeCosta, P.O. Box 70189, North Dartmouth, MA (US) 02747

( * ) Notice: Subject to any disclaimer, the term of this patent is extended or adjusted under 35 U.S.C. 154(b) by 0 days.

(21) Appl. No.: 11/351,164

(22) Filed: Feb. 9, 2006

Related U.S. Application Data

(60) Provisional application No. 60/652,372, filed on Feb. 14, 2005.

(51) Int. Cl.
*H05K 5/03* (2006.01)

(52) U.S. Cl. .......................... 174/66; 174/67; 174/135; 220/241; 220/3.8

(58) Field of Classification Search ................ 174/66, 174/67, 135, 58, 50; 220/241, 242, 3.8, 3.92, 220/3.94, 4.02; 248/906
See application file for complete search history.

(56) References Cited

U.S. PATENT DOCUMENTS 3,729,572 A * 4/1973 Helin .......................... 174/66
5,981,875 A * 11/1999 Kesler et al. ................. 174/66

* cited by examiner

*Primary Examiner*—Dhiru R. Patel

(57) ABSTRACT

A wall plate for engagement with an identical wall plate including an opening for the passage of wires or conduit therethrough. The plate is capable of being separated at its center to allow for the passage of oversized connectors and fittings and includes extender sections to increase the size of the opening. The invention includes a first plate section and identical second plate section that are mateable for easy separation and attachment. Both first and second plate sections include cantilever tab-like elements that extend from the ends of each plate section to join the plates.

15 Claims, 6 Drawing Sheets

SECTIONAL PLATE FOR WALL PORT

CROSS-REFERENCE TO RELATED APPLICATIONS

This application claims the benefit of U.S. Provisional Application No. 60/652,372 filed 14 Feb. 2005.

BACKGROUND OF THE INVENTION

1. Field of the Invention

The present invention relates to wall plates for electrical wiring, and more specifically, to a plate including an opening for the passage of wires or conduit. The plate is capable of being separated, then reconnected and securely interlocked at its center to allow for oversized connectors and fittings to be passed therethrough. The plate is secured to standard gem boxes and includes extender sections to increase the size of the opening.

2. Description of Related Art

Wall plates to cover electrical devices mounted in gem boxes are well known in the art. Wall box mounted devices such as switches and receptacles are commonly provided with a wall plate serving both as a decorative cover for the device and to prevent access to the areas which contain the electrical wiring. Such wall plates are usually mounted upon the device by one or more screws passing through openings in the plate and received in a threaded aperture in the device. In some installations, two or more devices are mounted in side-by-side relation with a corresponding wall plate for each device.

Other types of wall plates include plates that can be interlocked at their sides to provide for interchangeable wall panel assemblies for each configuration of electrical devices in any number of ganged gem boxes. Each wall plate includes specific openings to accommodate various electrical device apertures. However, there exists a need for a plate that allows for the aperture to be split then reconnected, to allow for varying size wires and connectors to pass therethrough. Furthermore, there exists a need for the connected plate to withstand the pulling forces of wires and connectors that would otherwise separate the connected plate.

SUMMARY OF THE INVENTION

The foregoing and other problems are overcome, and other advantages are realized, in accordance with the disclosed, alternative embodiments of these teachings.

The present invention relates to a plate including an opening for the passage of wires or conduit. The plate is capable of being separated at its center to allow for oversized connectors and fittings to be passed therethrough prior to the plate being reconnected and mounted to a gem box. The plate can be interlocked and secured to standard gem boxes and includes extender sections to increase the size of the opening. The plate interlocking means is designed to withstand the pulling forces of wires and connectors passing through the opening. The invention comprises a first plate section and identical second plate section that are mateable for easy separation and attachment. Both first and second plate sections include cantilever tab-like elements that extend from the ends of each plate section to join the plates. The extender sections utilize the same cantilever tab-like elements as the first and second plate sections for extending and joining the plates.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

While certain embodiments of the present invention have been illustrated and described herein, the present invention should not be limited to such illustrations and descriptions. It should be apparent to those skilled in the art that changes and modifications may be incorporated and embodied as part of the present invention and are within the scope of the claims.

Figure 1:
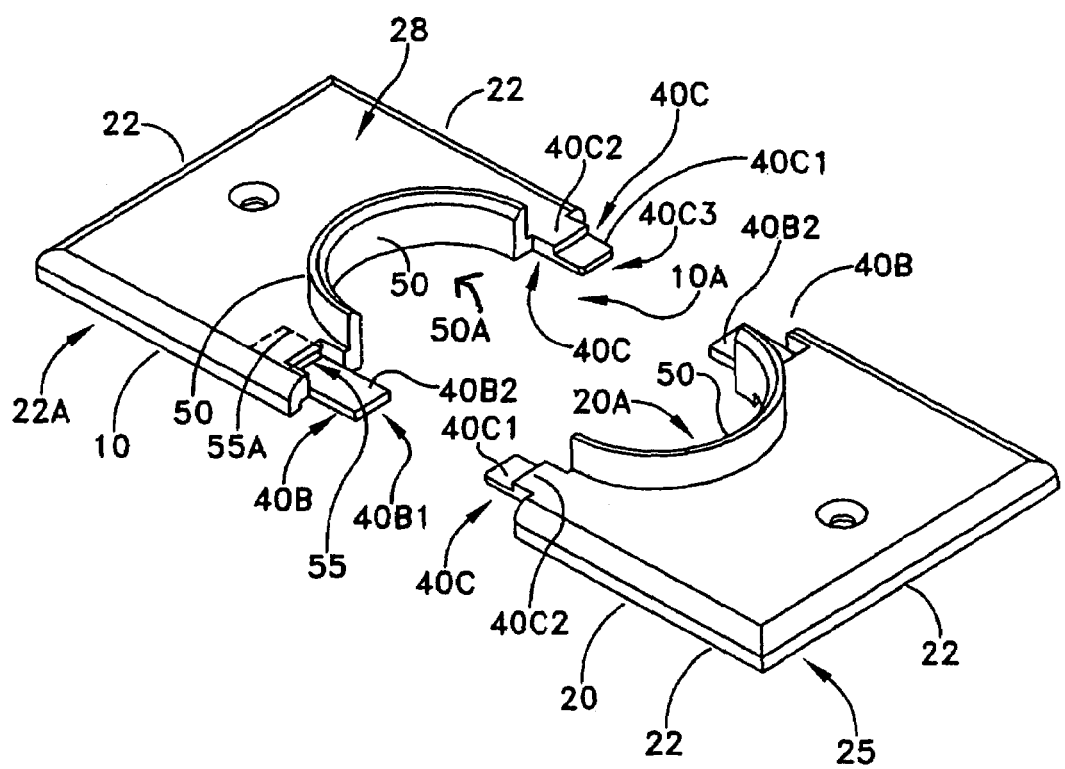
FIG. 1 illustrates an embodiment of subject invention in a single-gang configuration separated into first and second plate sections prior to being joined during installation.
Figure 5:
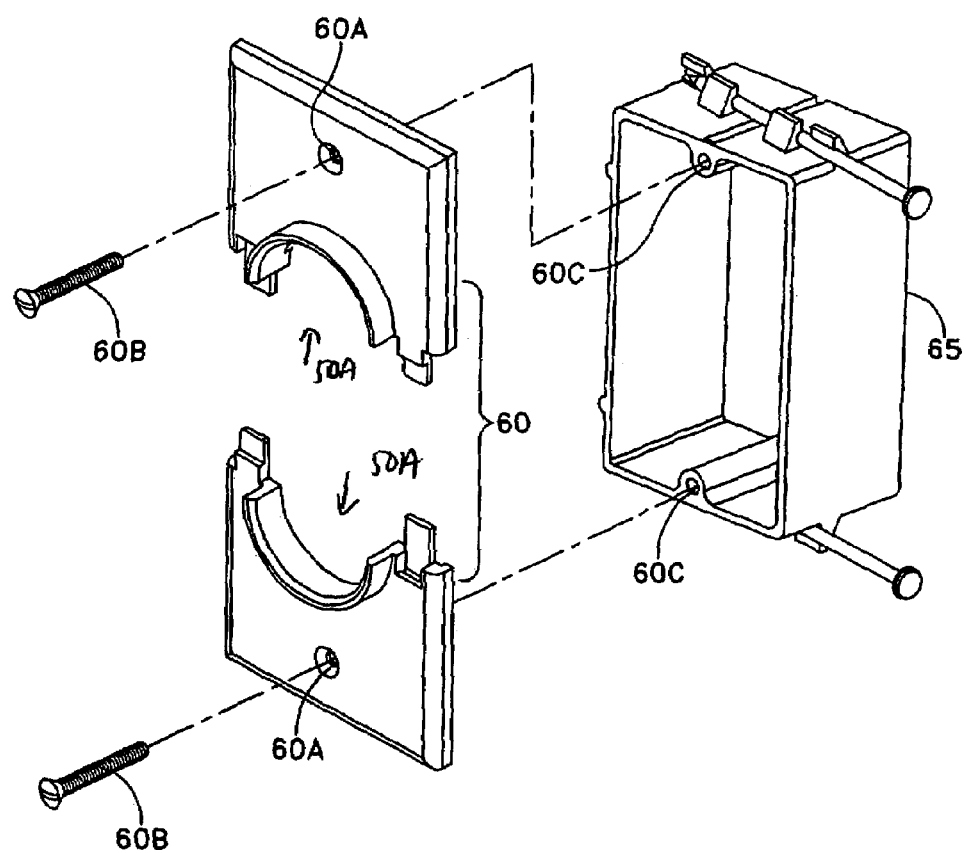
FIG. 5 is a perspective view of the invention for a single gang electrical box installation.
Figure 6:
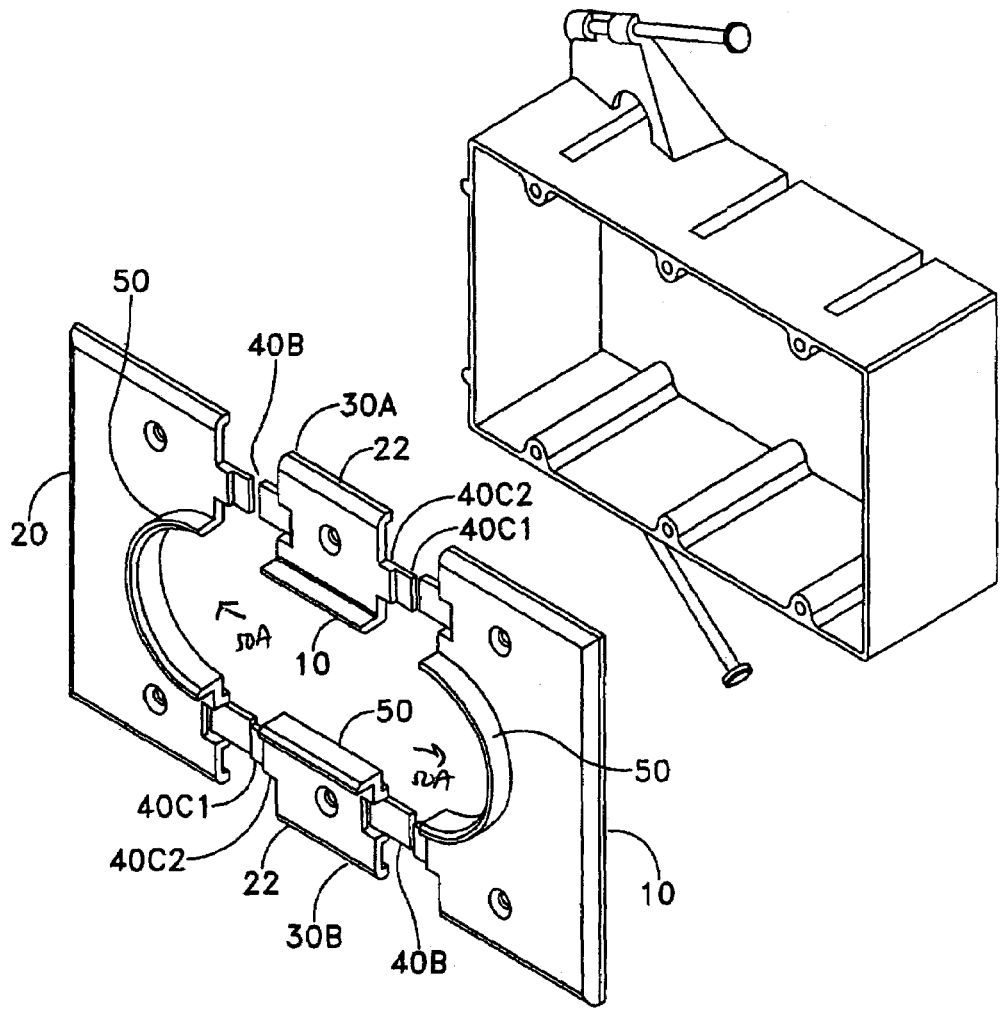
FIG. 6 is a perspective view of the invention in a dual-gang configuration with extender sections incorporated therein.

Referring to the drawings (FIGS. 1–8) of the invention in detail, FIG. 1 illustrates an embodiment of the present invention separated into a first plate section 10 and second plate section 20. These first and second plate sections are constructed for easy separation and engagement with each other. Plate sections 10 and 20 are identical in construction but are referred to separately to describe the separation and engagement of the plates. It is understood that any description of plate 10 applies to plate 20 and vice versa. It is further understood that extender plates 30A and 30B, as illustrated in FIG. 6, utilize identical mating cantilever tab-like elements as described below for plate 10 and 20. FIG. 6 illustrates a dual-gang plate configuration for applications requiring larger openings.

Plate sections 10 and 20 include a bottom surface 25 that includes a side wall extension 22. Extension 22 projects outward from bottom surface 25 extending around the periphery of the plate sections 10 and 20 forming a lip thereround. Referring to FIG. 1, first plate section 10 includes an end section 10A that engages an identical end section 20A of second plate section 20. End sections 10A and 20A include a center flange rim 50 that extends outward from the top surface 28 of first and second plate sections 10 and 20, the flange rim 50 defining the opening 50A for the passage of wires or conduit. The rim 50 acts as a bend radius control to limit cable bending, radius kinking, and inward forces created by bending cables. Also, the rim is a leverage surface to prevent the plate end sections 10A and 20A from collapsing-in during engagement. The rim also serves as a surface area for attaching wire management wrap/cover. First plate section 10 and second plate section 20 further include cantilever tab-like elements 40B and 40C, the fixed ends of which are integral outward extensions or continuations of end sections 10A and 20A. Tab elements 40B and 40C are rigid and have limited flexibility for movement away from a normal position by application of force. This construction resists plate separation that can occur from cables tugging and pushing against the plate sections when cables are arranged for installation.

Figure 2:
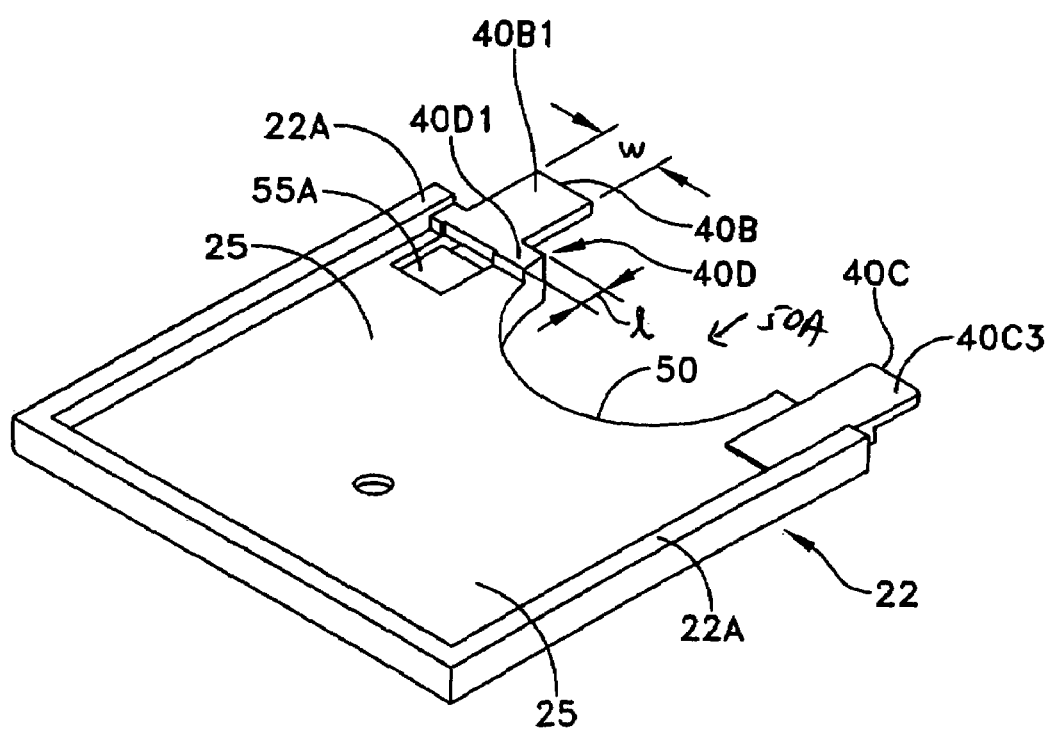
FIG. 2 is a bottom view of the first plate section of FIG. 1.
Figure 3:
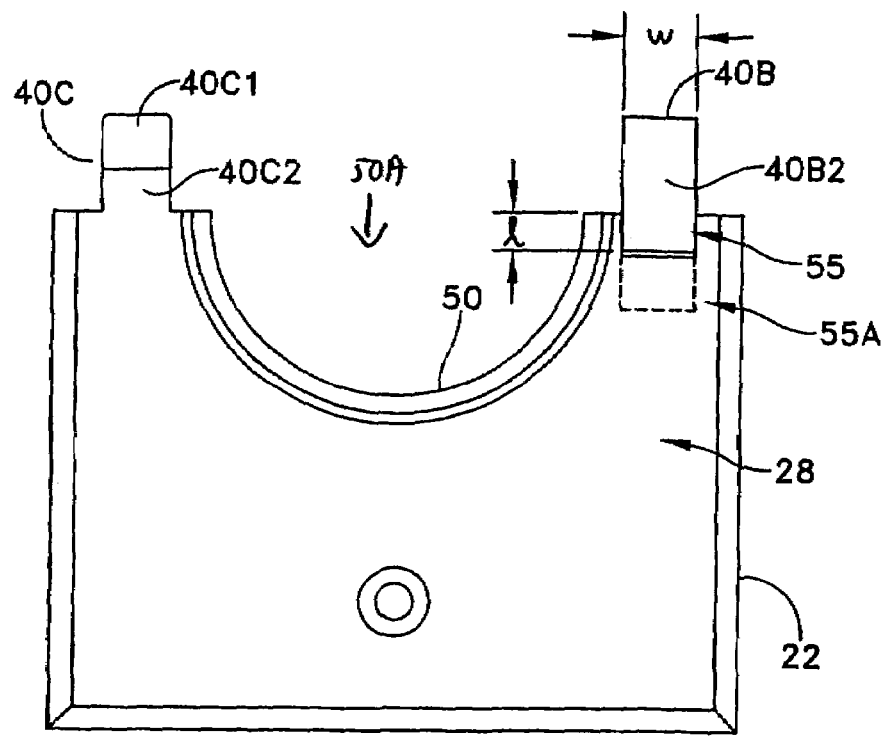
FIG. 3 is a top view of the first plate section of FIG. 1.
Figure 4:
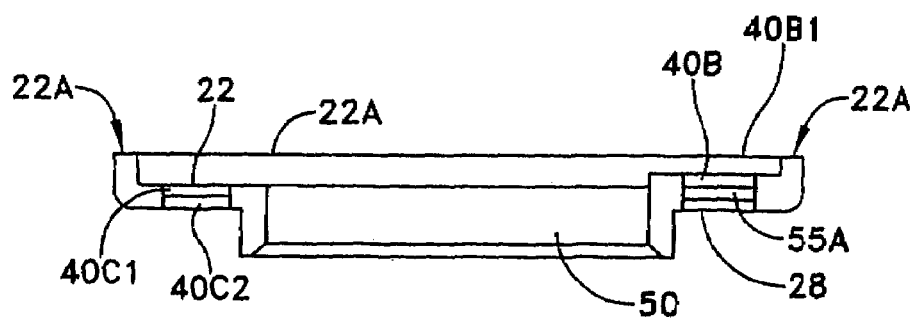
FIG. 4 is a top-view of the invention of FIG. 1.

Referring to FIG. 2, Tab 40B projects outward from a fixed end 40D that is affixed to and extends between flange rim 50 and sidewall extension 22. An area of fixed end 40D is secured to and rests planar against an area of bottom surface 25. The area of fixed end 40D that is secured to bottom surface 25 is determined according to desired resistance requirements to bending or pulling forces. The thickness of fixed end 40D and tab 40B is determined to allow for structural integrity, but should not extend beyond sidewall extension bottom surface 22A. In the disclosed embodiment, referring to FIGS. 1 and 2, sidewall extension bottom surface 22A is raised above fixed end bottom surface 40D1 and tab bottom surface 40B1. Referring to FIGS. 1 through 3, top surface 28 of plate sections 10 and 20 includes a cutout 55 extending the length l of fixed end 40D and the width w of tab 40B. Referring to FIG. 1, cutout 55 exposes top surface 40B2 of tab 40B.

Tab 40C comprises a stepped shaped member with an outwardly extending end portion 40C1 and generally perpendicular base portion 40C2. Tab 40C extends outward from the corners of end sections 10A and 20A, between flange 50 and sidewall extension 22, and is integral to bottom surface 25 such that sidewall extension bottom surface 22A extends beyond tab bottom surface 40C3. Tab bottom surface 40C3 is raised slightly above bottom surface 25, in the disclosed embodiment, up to 0.011 inches, for secure alignment of plate sections 10 and 20. Cutout 55 provides an opening above tab top surface 40B2 for insertion of base portion 40C2. Referring to FIGS. 2 and 3, a recess 55A extends from the periphery of fixed end 40D into bottom surface 25. The recess 55A is of sufficient dimension to allow for outwardly extending end portion 40C1 to slideably engage bottom surface 25 when plates 10 and 20 are mated together.

Referring to FIG. 1, first plate section 10 and second plate section 20 are brought together such that tabs 40B and 40C of each plate section engage the complete plate. End portion 40C slideably engages bottom surface 25 up to a point where base portion 40C2 is secured into cutout 55. Tab 40B inserts below tab 40C with tab top surface 40B2 slideably engaging tab bottom surface 40C3.

Figure 7:
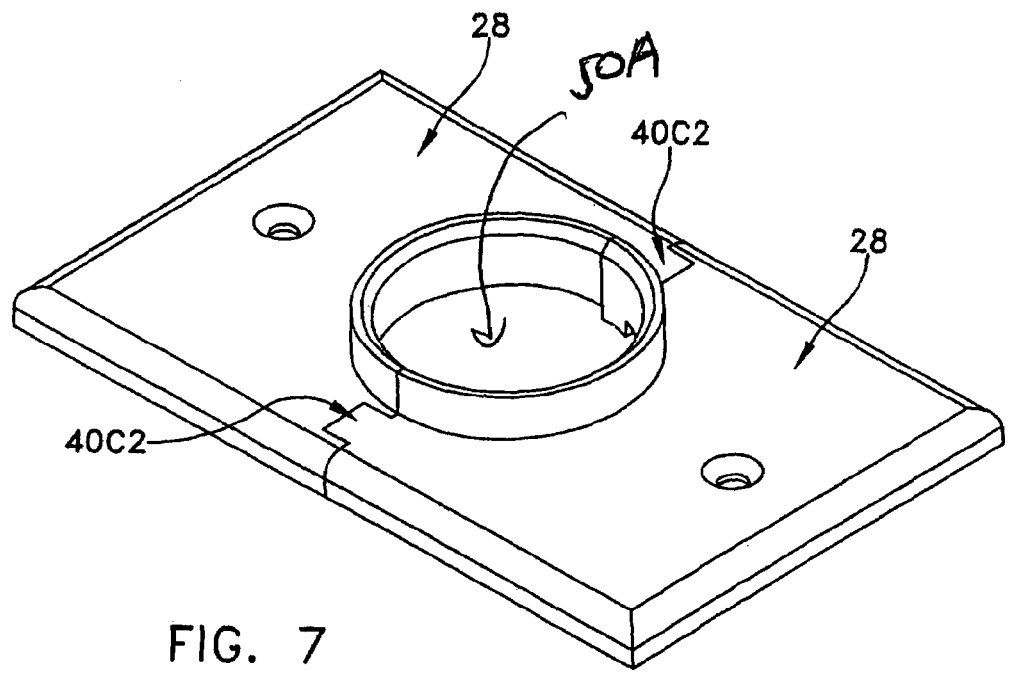
FIG. 7 is a perspective top view of the invention of FIG. 1 with the first and second plate sections joined together.
Figure 8:
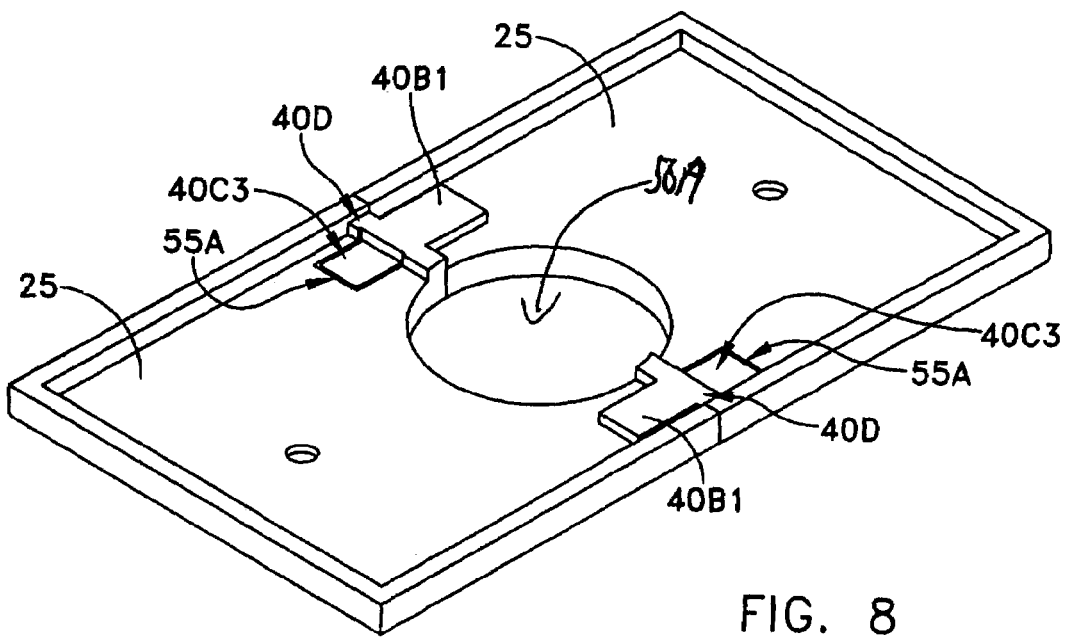
FIG. 8 is a perspective bottom view of the invention of FIG. 1 with the first and second plate sections joined together.

Referring to FIGS. 1 and 7, a top view of a connected plate illustrates base portions 40C2 secured into cutouts 55. Referring to FIG. 8, a bottom view of a connected plate illustrates tab bottom surfaces 40B1 and fixed end 40D placement along bottom surface 25. FIG. 8 further illustrates bottom surface 40C3 of end portion 40C1, which is secured within recess 55A. For the single gang embodiment illustrated in FIG. 1, when both first plate section 0.10 and second plate section 20 are engaged, sidewall extensions 22 and flanges 50 are continuous and the wall port 60 can be secured to an electrical box 65, as illustrated in FIG. 5.

Tabs 40B and 40C provide resistance to outward forces from cables bending or pulling against flange rim 50. Pass through apertures 60A allow screws 60B to secure wire port 60 to electrical box 65 via threaded apertures 60C. For applications where larger flange 50 openings 50A are desired, extender plate's 30A and 30B can be utilized as illustrated in FIG. 6. Plates 30A and 30B extend the flange 50 and sidewall extension 22 utilizing identical mating cantilever tab like elements described above. The plate sections 10 and 20 of subject invention may be manufactured through stamping, injection molding, metal casting or other available means known in the art. The plate sections may be made from a polymer based moldable material or other similar materials known in the art.

It is understood that the size of the plate sections including the extender sections may vary according to the particular application. Furthermore it is understood that the placement of cantilever tab-like elements 40B and 40C along end sections 10A and 10B may vary according to the size of the plate sections utilized. It is understood that these variations are within the scope of the present invention.

I claim:

1. A wall plate assembly having first and second interchangeable sections, each section comprising:
   a panel having a top surface and a bottom surface, said panel having at least one mounting aperture therethrough from said top surface to said bottom surface, to permit said panel to be mounted to an electrical device,
   said panel having a sidewall extension, said sidewall extension meeting said top surface and said bottom surface at a rounded edge, said sidewall extension projecting outward from said bottom surface,
   said panel having an end section, said end section having first and second engagement tabs extending outward therefrom,
   said end section having an opening, said opening located between said first and second engagement tabs,
   said first and second engagement tabs of said first and second interchangeable sections being relatively configured and arranged such that, upon relative linear movement of said end section of said panel of said first interchangeable section with said end section of said panel of said second interchangeable section into engagement with one another, said first engagement tab of said first interchangeable section, engages said second engagement tab of said second interchangeable section, and said second engagement tab of said first interchangeable section engages said first engagement tab of said second interchangeable section, said engaged first and second interchangeable sections defining a second opening, the periphery of said second opening being the sum of the peripheries of said opening of said first and second interchangeable sections.

2. A wall plate assembly according to claim 1, wherein said outwardly extending second engagement tab is a stepped shaped member.

3. A wall plate assembly according to claim 2, wherein said stepped shaped member includes a base portion and an end portion, said base portion including a top surface, said base portion top surface substantially planar to said panel top surface, said end portion stepped down from said base portion top surface and extending outward therefrom, said end portion further including a top surface and a bottom surface, said end portion bottom surface substantially planar to said panel bottom surface.

4. A wall plate assembly according to claim 3, wherein said stepped shaped member end portion bottom surface is raised above said panel bottom surface.

5. A wall plate assembly according to claim 4, wherein said end portion bottom surface is raised up to 0.011 inches.

6. A wall plate assembly according to claim 3, wherein said first engagement tab includes a first tab base and a first tab end, said first tab base and said first tab end including a top surface and a bottom surface, a first portion of said first tab base top surface affixed to said bottom surface of said panel, said first tab end projecting outward from said first tab base.

7. A wall plate assembly according to claim 6, wherein said first engagement tab further includes an opening for receipt of said second engagement tab therein, said opening including a cutout in said panel end section, said cutout exposing a second portion of said first tab base top surface, said opening further including a recess in said panel bottom surface, said recess extending from the periphery of said cutout, said recess dimensioned to accept said stepped down end portion.

8. A wall plate assembly according to claim 7, wherein said cutout is dimensioned to accept said base portion of said stepped shaped member securely therein, wherein said recess is dimensioned to accept said stepped down end portion of said stepped shaped member securely therein, said first engagement tab end top surface slideably engaging said stepped shaped member end portion bottom surface, said first and second engagement tabs being interconnected.

9. A wall plate assembly according to claim 8, wherein said stepped shaped member end portion bottom surface is raised above said panel bottom surface, said raised bottom surface allowing for proper alignment of said interconnected plates.

10. A wall plate assembly according to claim 9, wherein said stepped shaped member end portion bottom surface is raised up to 0.011 inches.

11. A wall plate assembly according to claim 6, wherein said sidewall extension projects past said bottom surface of said first engagement tab end.

12. A wall plate assembly according to claim 3, wherein said sidewall extension projects past said bottom surface of said stepped shaped member end portion.

13. A wall plate assembly according to claim 1, wherein said first and second interchangeable sections include an outwardly extending flange rim, said flange rim extending outward from the periphery of said first and second openings, said flange rim acting as a bend radius.

14. A wall plate assembly according to claim 13, wherein said first and second engagement tabs are located between said flange rim and said sidewall extension.

15. A wall plate assembly according to claim 1, wherein said first and second interchangeable sections further include first and second plate extensions, said first and second plate extensions interposed between said end sections of said first and second interchangeable sections, said first and second plate extensions engaging said first and second end sections, said first and second plate sections increasing the periphery of said second opening.

* * * * *